(12) United States Patent
Wankmueller

(10) Patent No.: US 7,360,694 B2
(45) Date of Patent: Apr. 22, 2008

(54) SYSTEM AND METHOD FOR SECURE TELEPHONE AND COMPUTER TRANSACTIONS USING VOICE AUTHENTICATION

(75) Inventor: John Wankmueller, Great Neck, NY (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 10/764,099

(22) Filed: Jan. 23, 2004

(65) Prior Publication Data

US 2004/0243514 A1 Dec. 2, 2004

Related U.S. Application Data

(60) Provisional application No. 60/442,143, filed on Jan. 23, 2003.

(51) Int. Cl.
G06K 5/00 (2006.01)
(52) U.S. Cl. .................. 235/382; 235/379; 235/380
(58) Field of Classification Search ........ 235/379–383; 902/3–5, 22; 382/115; 705/39, 41, 43, 44
See application file for complete search history.

(56) References Cited

U.S. PATENT DOCUMENTS

| | | | | |
|---|---|---|---|---|
| 3,896,266 A | * | 7/1975 | Waterbury | .................. 902/22 |
| 5,430,827 A | * | 7/1995 | Rissanen | ..................... 704/272 |
| 5,513,250 A | * | 4/1996 | McAllister | ................ 379/91.02 |
| 5,594,789 A | * | 1/1997 | Seazholtz et al. | ......... 379/88.02 |
| 6,023,688 A | * | 2/2000 | Ramachandran et al. | ...... 705/44 |
| 6,213,391 B1 | * | 4/2001 | Lewis | ......................... 235/380 |
| 6,266,640 B1 | * | 7/2001 | Fromm | ........................ 235/380 |
| 6,601,762 B2 | * | 8/2003 | Piotrowski | ................... 235/382 |
| 2002/0035539 A1 | * | 3/2002 | O'Connell | .................... 705/39 |
| 2002/0147685 A1 | * | 10/2002 | Kwan | ........................... 705/44 |
| 2003/0037004 A1 | * | 2/2003 | Buffum | ........................ 705/51 |
| 2003/0154139 A1 | * | 8/2003 | Woo | ............................. 705/26 |

FOREIGN PATENT DOCUMENTS

| EP | 598469 A2 | * | 5/1994 |
|---|---|---|---|
| WO | WO02071176 A2 | * | 9/2002 |
| WO | WO 2005001635 A | * | 1/2005 |

* cited by examiner

Primary Examiner—Uyen-Chau N Le
(74) Attorney, Agent, or Firm—Baker Botts LLP

(57) ABSTRACT

A secure electronic payment system and method for conducting a secure transaction using voice authentication is provided. A merchant's computer transmits an authorization request to an access control server. The access control server places a telephone call to the purchaser and performs voice authentication to confirm the identity of the purchaser. The access control server then transmits a response to the merchant's computer. If the purchaser is authorized to access the account, payment is processed by the merchant and the transaction is completed.

16 Claims, 6 Drawing Sheets

SYSTEM AND METHOD FOR SECURE TELEPHONE AND COMPUTER TRANSACTIONS USING VOICE AUTHENTICATION

CROSS-REFERENCE TO RELATED APPLICATIONS

This application claims priority to the following application which is incorporated herein by reference in its entirety: U.S. Provisional Patent Application No. 60/442,143, entitled "System and Method for Secure Telephone Order Payments Using Voice Authentication," filed on Jan. 23, 2003.

BACKGROUND OF THE INVENTION

On-line shopping offers unprecedented ease and convenience for consumers, while enabling merchants to reduce costs and obtain new customers. However, many consumers have been reluctant to take advantage of these benefits due to fear of theft of sensitive information such as credit card numbers. Efforts have been made to increase the security of such information. For example, in the secure socket layer (SSL) technique, messages sent between the consumer and the merchant are encrypted, thereby making it more difficult for a third party to intercept and use the information. However, this method does not provide the merchant with any verification of the identity of the consumer. Accordingly, if a third party were to obtain a credit card number by other fraudulent means such as theft of physical credit card, the SSL method would not prevent the third party from fraudulently using the stolen information.

Secure Electronic Transaction (SET™) techniques attempt to solve the foregoing problems by using digital certificates to authenticate the consumer/account holder, the merchant, and the credit card issuer. Each certificate is issued by a trusted certificate authority. While SET™ is currently the most secure way to handle payments over the Internet, it requires digital certificates and cryptographic software to be installed and operated on the account holder's computer.

In fact, most prior art secure electronic commerce systems require consumers to install special software on their computers. Yet, many consumers are reluctant to install such software and, in any case, a specialized account holder application may not be compatible with a wide variety of account holder access devices—e.g., personal computers, personal digital assistants, and mobile communication devices such as mobile telephones. As a result, it has been difficult for some secure electronic commerce systems to gain widespread acceptance among consumers.

Similar security concerns apply for more conventional transactions conducted via telephone. Transactions conducted by telephone generally do not provide a merchant with any verification of the identity of the purchaser. Accordingly, if a third party were to obtain a credit card number by fraudulent means such as theft of a physical credit card, the above-described methods would be likewise ineffective in preventing unauthorized transactions using the stolen credit card.

Systems have been implemented wherein a telephone call is placed to the consumer before processing the transaction to verify the consumer's authorization of payment. However, these systems cannot confirm the identity of the party answering the call and giving the spoken authorization. A third party who obtains a credit card number by fraudulent means may also provide telephone contact information different from that of the true Cardholder, such that the telephone call will be placed to the fraudulent third party or yet another fraudulent third party. Moreover, these systems suffer from additional disadvantages in that they require live operator interaction and are accordingly slower, less cost-effective and generally inefficient.

SUMMARY OF THE INVENTION

It is therefore an object of the present invention to provide a method of conducting on-line transactions wherein the identity of the purchaser is authenticated using voice authentication techniques.

It is an additional object of the present invention to provide a method of conducting a transaction via telephone wherein the identity of the purchaser is authenticated using voice authentication techniques.

These and other objects are accomplished by a system and method for conducting a secure transaction which preferably includes the steps of providing a database with at least a first voice sample associated with a holder of the payment account, providing payment account information associated with the account, the account information to be used for conducting the transaction, transmitting an authentication request including the payment account information to an access control server, triggering automatically a telephone call to the holder of the payment account, generating a second voice sample by sampling one or more voice characteristics of the holder of the payment account, and using voice authentication technology to compare the first voice sample to the second voice sample to determine whether the transaction is authorized by the payment account holder.

The objects of the invention are also addressed by a method for conducting a secure transaction using voice authentication which preferably includes the steps of receiving payment account information associated with the payment account, transmitting an authentication request including the payment account information to an access control server and the authentication request triggering automatically by the server a telephone call to the holder of the account, using voice authentication technology to authenticate the voice of the holder for purposes of authorizing the transaction, and preferably authorizing the transaction as a function of the authentication.

The objects of the invention are also addressed by a method for conducting a secure transaction using voice authentication which preferably includes the steps of providing a database which includes at least a first voice sample associated with a holder of the payment account, receiving payment account information associated with the payment account to be used for conducting the transaction, receiving an authentication request including the payment account information in connection with conducting the transaction, triggering automatically a telephone call, in response to the request, to the holder of the payment account, generating a second voice sample by sampling one or more voice characteristics of the holder of the payment account, and using voice authentication technology to compare the first voice sample to the second voice sample to determine whether the transaction is authorized by the payment account holder.

The objects of the invention are further addressed by a system for conducting a secure transaction using voice authentication, which preferably includes an issuer server computer subsystem, the server computer subsystem having stored information relating to a payment account, an automated voice response subsystem, and a voice authentication subsystem, wherein the automated voice response subsystem triggers a telephone call to a voice authorization party to sample the voice authorization party's voice, and further where the voice authentication subsystem compares the sampled voice to data stored by the issuer server computer subsystem to determine whether the voice authorization party is authorized to access the payment account.

BRIEF DESCRIPTION OF THE DRAWINGS

Further objects, features, and advantages of the present invention will become apparent from the following detailed description taken in conjunction with the accompanying figures showing illustrative embodiments of the invention, in which.

Throughout the figures, unless otherwise stated, the same reference numerals and characters are used to denote like features, elements, components, or portions of the illustrated embodiments.

DETAILED DESCRIPTION OF THE INVENTION

Figure 1:
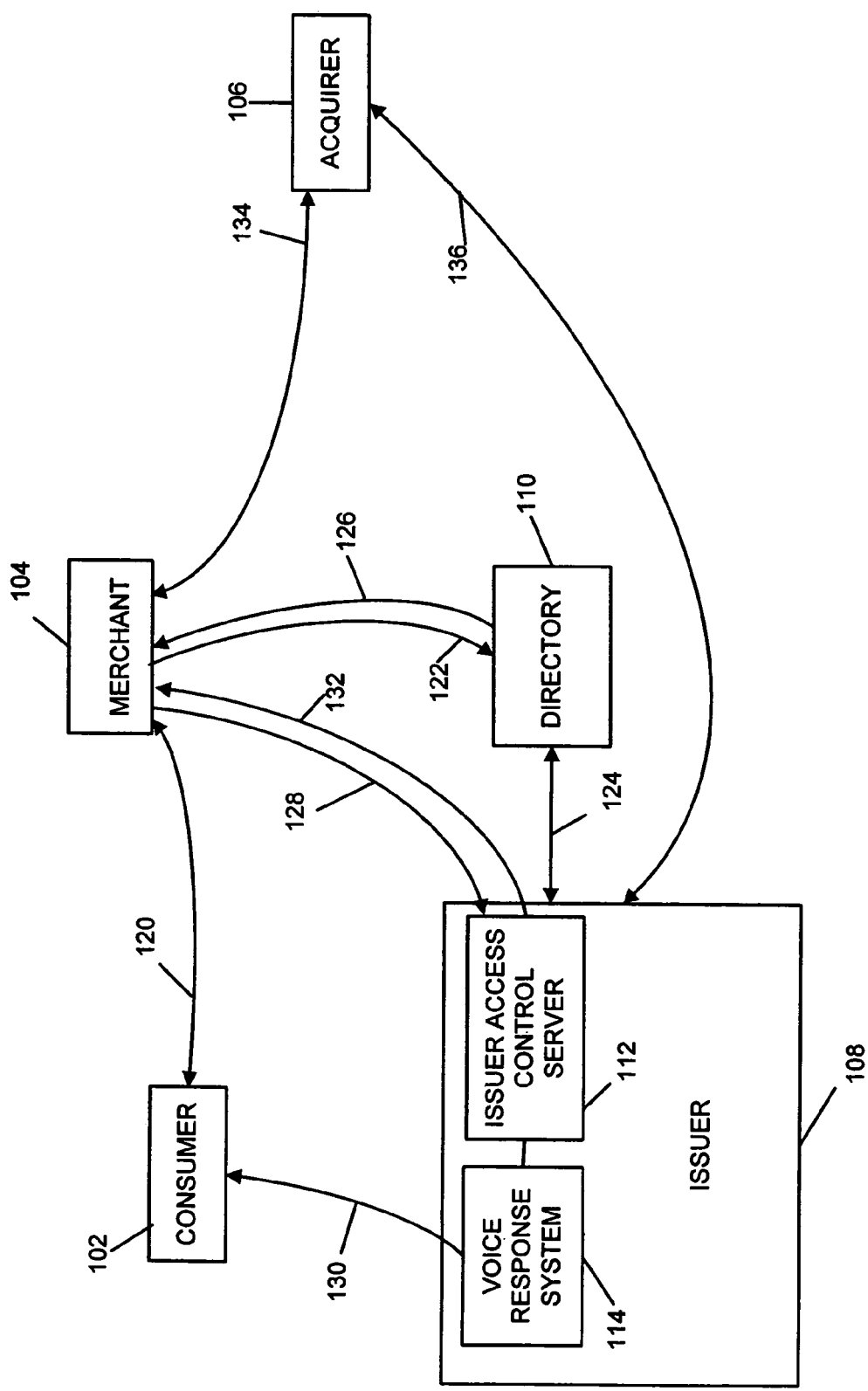
FIG. 1 is a block diagram illustrating an additional exemplary system for conducting a payment transaction in accordance with the present invention.

FIG. 1 illustrates an exemplary method for performing secure payment transactions in accordance with the present invention. The system includes a consumer 102, a merchant 104 selling goods and/or services, an acquirer 106—typically the merchant's acquiring bank—and an issuer 108—typically a financial institution such as a bank—that has issued a payment account being used to conduct a transaction with the merchant. The system may also include a cardholder directory/database 110 which stores information regarding the cardholder's account. The database 110 is operated by a payment organization such as the MasterCard® payment organization and is preferably a server computer connected to a network such as the Internet. The system preferably further includes, as part of the issuer system 108, an issuer access control server 112 which is mated to an automated interactive voice response system 114.

The consumer 102 may be conducting the transaction 120 with the merchant 104 via telephone or through a computer network such as the Internet. The system and method of the present invention may be implemented regardless of the means by which the transaction between the user and merchant is conducted, and the present invention accordingly shall not be limited to telephone and/or internet-based transactions. The payment account used to pay for the goods or services rendered by merchant 104 is typically a credit card account, a debit card account, and/or any other type of payment card account. The account can, but need not be, associated with a physical card. For example, the payment account can be associated with a virtual card which can be stored electronically on a computing device used by consumer 102. The consumer can, but need not be, the account holder, and as used herein the term "holder" includes one or more individuals associated with and authorized to use a payment account or payment card.

In one exemplary embodiment of a method according to the present invention, transaction 120 is conducted between a consumer 102 and a merchant 104, using a payment card such as a MasterCard® credit card. Consumer 102 selects the goods/services to purchase, and places an order with merchant 104, thereby providing merchant 104 with payment account information, including MasterCard® credit card information such as account number, expiration date, and name of the cardholder. merchant 104, using a computer system connected to a network, transmits a query 122 to a directory 110 such as a MasterCard® directory to determine the cardholder's participation in voice authentication services.

The directory 110 then preferably communicates 124 with the issuer 108 to verify cardholder participation. This verification 124 may be conducted directly with an issuer access control server 112, which preferably is part of an issuer system 108. Assuming the cardholder is verified as utilizing voice authentication services, directory 110 transmits to the merchant 104 an enrolment verification message 126 verifying the cardholder's enrolment for voice authentication services. After the merchant 104 receives the VERes message from the directory 110, the merchant 104 may inform the consumer 102 that voice authentication will be performed. The merchant 104 preferably then transmits to issuer access control server 112 a request for authentication 128. The request for authentication 128 may include the cardholder's telephone number or, alternatively, the cardholder may be contacted using a telephone number already on file with the issuer 108.

Upon receipt of the authentication request from the merchant 104, the issuer access control server 112 then preferably initiates a voice authentication procedure. Issuer access control server 112 causes an interactive voice response system 114 to place or trigger a telephone call 130 to the cardholder. The cardholder may preferably be the consumer 102 or, alternatively, the consumer may be a purchaser who is authorized by the cardholder to pay for the transaction with the merchant. The latter case may apply where, for example, an agent of the cardholder is directed to purchase goods or services on behalf of the cardholder. As used herein, the term "holder" includes any of these individuals.

The telephone number used may preferably be one extracted from the authentication request message 128 transmitted from the merchant 104. Where a telephone number is not provided by the merchant 104, the issuer system may instead use a cardholder telephone number which is on file with the issuer. Furthermore, if the interactive voice response system 114 is unable to complete a telephone call to a telephone number provided by the merchant 104 as part of authentication request 128, the cardholder telephone number on file may be used.

During telephone call 130, the receiving party's voice is sampled and authenticated using known voice authentication techniques. For example, the interactive voice response system 114 may instruct the receiving party to repeat a random word or phrase. The receiving party's voice may then be sampled and compared with cardholder voice data which is on file with the issuer. If the sampled voice characteristics indicate that the party on the receiving end of the telephone call is the cardholder, and preferably, the party on the receiving end of the call authorizes the transaction, the transaction is voice-authenticated. This may be indicated to the party on the receiving end of the call by playing some audible indicator, e.g., a MasterCard® audible brand mark.

Notably, the triggered telephone call 130 to the cardholder for voice authentication may be placed in numerous ways in accordance with the present invention. For example, the call may be placed through the conventional means through a telephone network as is known in the prior art. The telephone call 130 may also be placed via wireless or cellular telephone, by two-way radio, by VoIP (voice over IP), or any other means by which the interactive voice response system 114 can sufficiently sample the voice of the authenticating party on the receiving end of the telephone call 130 (including means which may not utilize a telephone at all).

Additionally, the voice authentication performed by the interactive voice response system 114 and issuer access control server 112 may be advantageously performed by some other sub-system which is either a part of the issuer system 108 or which is external to issuer 108. For example, an external service may be utilized to place a telephone call 130 to the cardholder. Moreover, the voice authentication process as described herein is not limited to the specific process described, but may include any known means by which an automated system may confirm the identity of a caller by utilizing voice sampling. Such embodiments are within the scope of the present invention.

Continuing with the description of the exemplary embodiment of a system according to the present invention, if the issuer access control server 112 determines that the transaction has been properly authenticated, an authentication response 132 is preferably transmitted to the merchant 104, indicating that the transaction has been voice authenticated. Thereafter, the transaction may be completed as would otherwise be known in the art, e.g., through communications 134 between the merchant 104 and an acquirer 106 and communications 136 between acquirer 106 and issuer 108. An exemplary embodiment of the present invention may be implemented in conjunction with security protocols such as the 3-D Secure authentication protocol. The 3-D Secure authentication protocol is known in the art and has generally been adopted and implemented across the payment industry. The present invention may be implemented in conjunction with MasterCard®'s implementation of 3-D Secure as described in U.S. Provisional Patent Application No. 60/477,187, entitled "Algorithm for use in a Secure Payment Application," filed on Jun. 10, 2003, which is incorporated herein by reference in its entirety, and related applications. However, it is noted that the scope of the present invention shall not be limited to this implementation of telephone voice authentication using the 3-D Secure protocol; voice authentication concepts described herein may be broadly applied in numerous ways as would be apparent to one skilled in the related art.

Additional detail regarding completion of the transaction using MasterCard®'s implementation of the 3-D Secure protocol can be found in the following applications, all of which are also incorporated herein by reference in their entirety: U.S. patent application Ser. No. 09/963,274, entitled "A Universal and Interoperable System and Method Utilizing a Universal Cardholder Authentication Field (UCAF) For Authentication Data Collection and Validation," filed on Sep. 26, 2001; U.S. Provisional Patent Application No. 60/280,776, entitled "System and Method for Secure Payment Application (SPA) and Universal Cardholder Authentication," filed on Apr. 2, 2001; U.S. Provisional Patent Application No. 60/295,630, entitled "Method and Process for a Secure Payment Application Using a Universal Cardholder Authentication Field," filed on Jun. 4, 2001; U.S. Provisional Patent Application No. 60/307,575, entitled "Method and System for Conducting Transactions Over a Communication Network Using a Secure Payment Application," filed on Jul. 24, 2001; U.S. patent application Ser. No. 09/886,486, entitled "Method and System for Conducting Secure Payments Over a Computer Network Without a Pseudo or Proxy Account Number," filed on Jun. 22, 2001; U.S. patent application Ser. No. 09/886,485, entitled "Method and System for Conducting Secure Payments Over a Computer Network," filed on Jun. 22, 2001; U.S. patent application Ser. No. 10/096,271, entitled "System and Method for Conducting Secure Payment Transactions," filed on Mar. 11, 2002; and U.S. Provisional Patent Application No. 60/352,968, entitled "MasterCard UCAF™ and SPA™ Client-less Solution," filed on Jan. 30, 2002.

Figure 2:
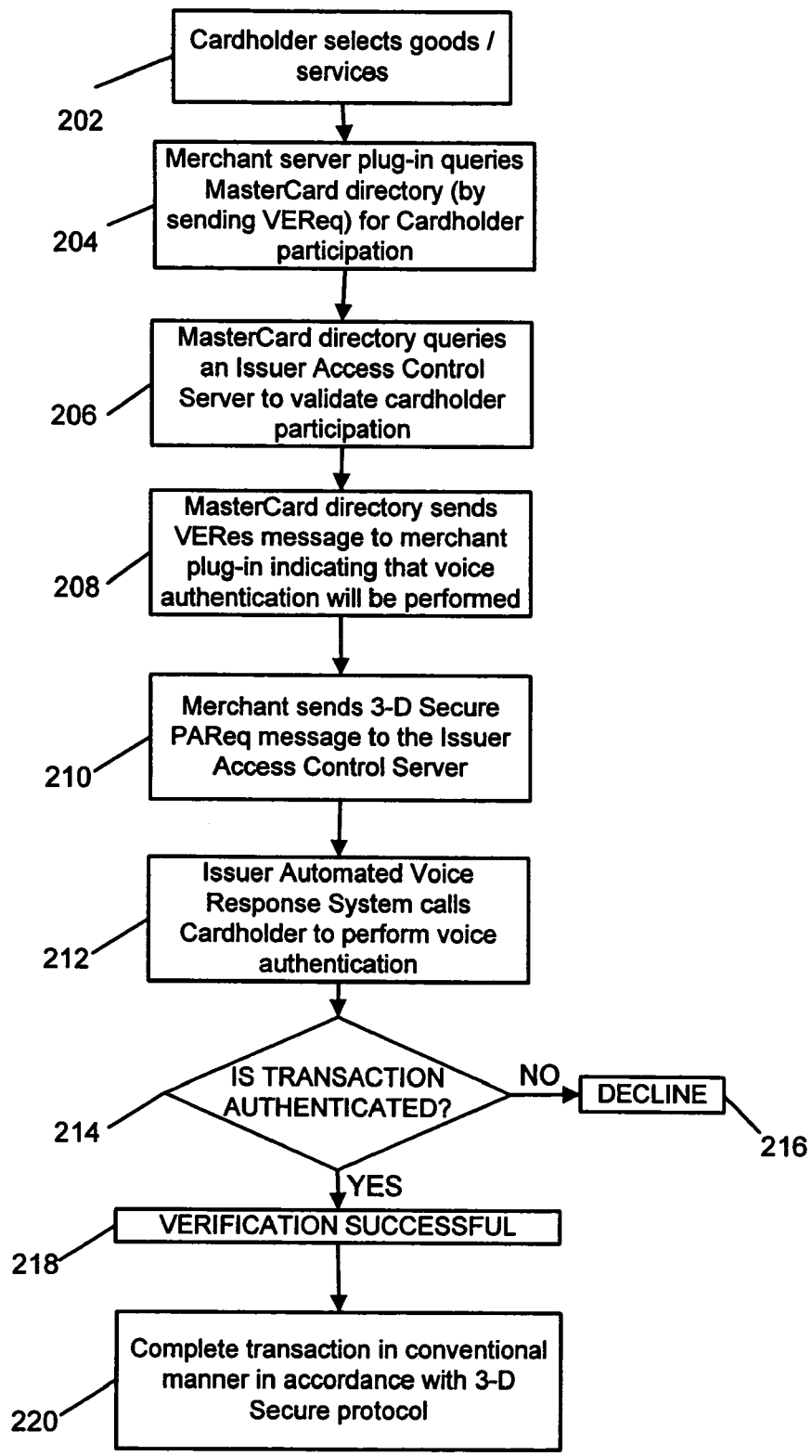
FIG. 2 is a flow diagram illustrating an exemplary procedure for conducting a payment transaction in accordance with the present invention.

FIG. 2 illustrates an exemplary procedure for operating the payment transaction system illustrated in FIG. 1 using voice authentication, in conjunction with a 3-D Secure authentication protocol. First, a consumer selects goods and/or services which are the subject of the transaction (Step 202). Next, the merchant computer system queries a MasterCard® directory to verify cardholder participation in the voice authentication system (Step 204). This query may preferably be in the form of a 3-D Secure Verify Enrolment Request (VEReq) message, as described in detail in the references incorporated hereinabove. Notably, the merchant system may be configured with a software plug-in to facilitate compatibility and efficient interoperability with, e.g., the issuer and directory systems. This plug-in may be used to translate data from the merchant system into a format suitable for use by the issuer system, and vice-versa. Such a plug-in would be useful to facilitate upgrading a merchant's current system for use with a system and method in accordance with the present invention, though such an upgrade is not necessary within the scope of the present invention. Additionally, the plug-in may be composed of software, hardware, or some combination thereof.

Next, the MasterCard® directory communicates with an Issuer Access Control Server to verify cardholder participation (Step 206). Assuming cardholder participation is verified, the MasterCard® directory then transmits an enrolment verification message to the merchant computer system (Step 208), indicating that voice authentication will be performed (Step 212). The enrolment verification message may preferably be in the form of a Verify Enrolment Response (VERes) message in accordance with MasterCard®'s implementation of 3-D Secure as referenced above. Also as described above, this message may be received by a software plug-in in the merchant system, which plug-in provides interoperability with the merchant's current system.

More particularly, the format of the VEReq and VERes messages in accordance with this exemplary embodiment of the present invention may preferably be according to the following. The VERes message preferably includes a "Device Category" field, which may be set to a particular value to indicate the type of channel which is being used for shopping (e.g., "3" for voice shopping). Next, an "Authentication Request Channel" field is preferably used. The value of this field shall be defined to indicate the parties between which the 3-D PAReq and PARes messages are being exchanged (e.g., a value of "direct" to indicate that the Payer Authentication Request (PAReq) and Payer Authentication Response (PARes) messages will be exchanged directly between a merchant and the issuer access control server). The VEReq also optionally includes a "Cardholder phone number hash" field, which may contain the telephone number for contacting the cardholder for voice authentication. Optionally, a number which is already on file with the issuer 108 may be used for conducting voice authentication. Preferably the VEReq and VERes messages will also include a "Voice Channel Transfer Method" field, which may be set to some value (e.g., "endcall") to instruct the issuer system to perform voice authentication. Notably, the VEReq and VERes messages may contain other fields or may be configured differently in accordance with other embodiments of the present invention.

After the merchant receives the VERes from the MasterCard® directory, which validated cardholder participation, the merchant then sends an authentication request message (Step 210) to the issuer system. The request message may preferably be a 3-D Secure Payer Authorization Request (PAReq) message, and may be received by the Issuer's Access Control Server. The PAReq message preferably includes a plurality of data fields, e.g., including a "Cardholder phone" field which shall contain the phone number at which the cardholder can be contacted for voice authentication, and a "Request Expiration" field, which may be used to indicate the date and time when the merchant plug-in will allow the transaction to time out if no Payer Authentication Response (PARes) is received from the Issuer Access Control Server by the merchant plug-in.

After the Issuer Access Control Server receives the PAReq message, it then initiates voice authentication (Step 212). Upon completion of the voice authentication procedure, described more fully in conjunction with FIG. 3 below, an authentication response is generated by the Issuer Access Control Server and transmitted to the merchant, indicating the result of the voice authentication procedure. The authentication response may be in the form of, e.g., a Payer Authentication Response (PARes) in accordance with the 3-D Secure protocol.

If voice authentication fails or times out, the transaction may still be commenced depending on the reason for failure and configuration of the particular embodiment of the system according to the present invention. However, if authentication fails due to an apparent authorization problem, signaling a potential fraudulent transaction, authentication may be declined (Step 216) and the transaction cancelled. In contrast, if voice authentication completes successfully (Step 218), then the transaction may be completed in the conventional manner in accordance with the 3-D Secure protocol (Step 220).

Figure 3:
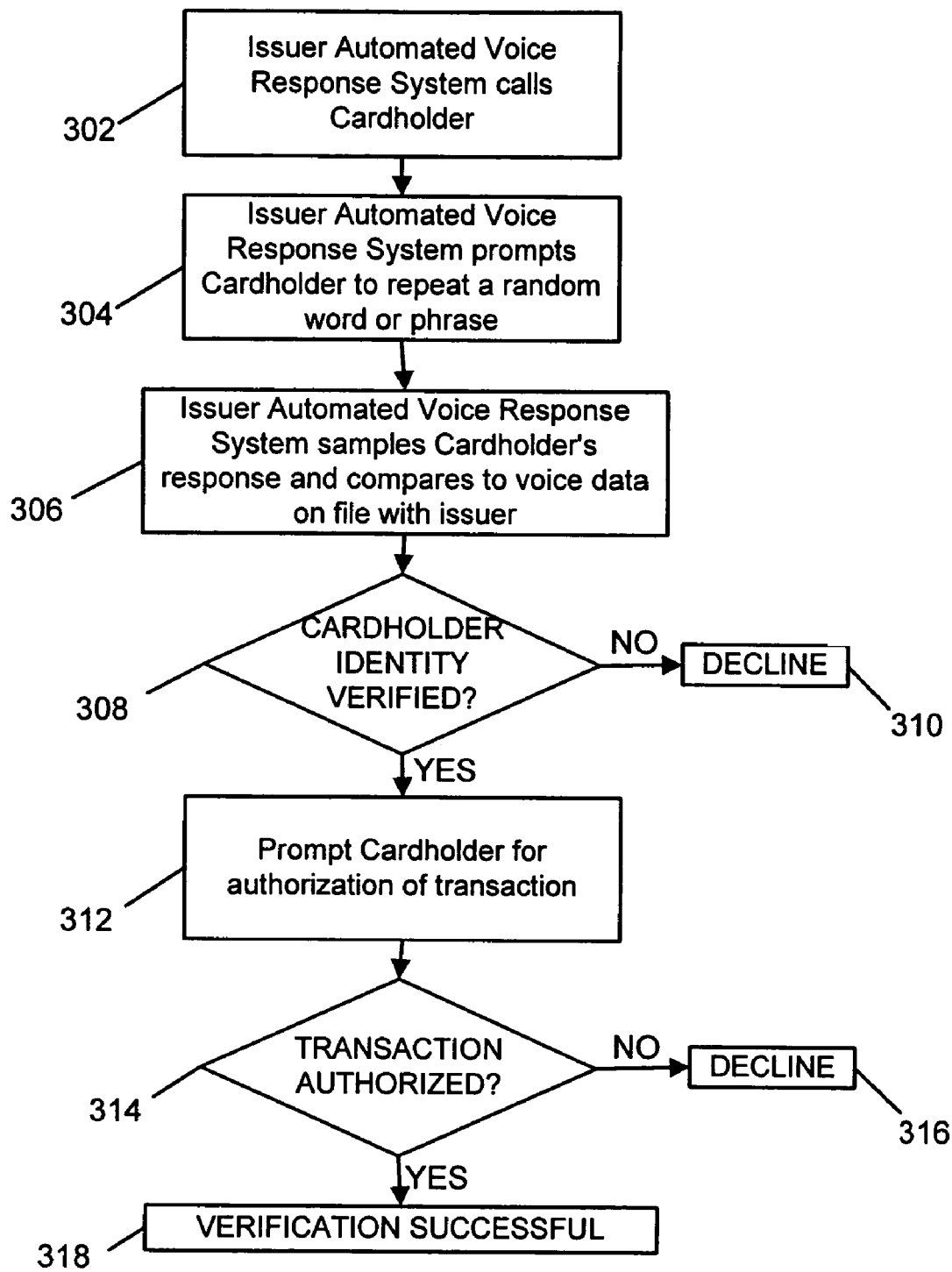
FIG. 3 is a flow diagram illustrating an exemplary procedure for conducting a payment transaction in accordance with the present invention.

An exemplary procedure for performing voice authentication (Step 212 of FIG. 2) is illustrated in FIG. 3. When the issuer system receives a request from a merchant to perform voice authentication, the Issuer Automated Voice Response System preferably calls the cardholder (Step 302). The call is placed to the number provided as part of the merchant's request, or, alternatively, to a cardholder telephone number on file with the issuer.

After the call is connected with a party believed to be the cardholder, the Issuer Automated Voice Response System prompts the party to repeat a random word or series of words (Step 304), to allow the Issuer Automated Voice Response System to obtain a sample of the party's voice (Step 306). The sampled voice is then compared with a sample on file with the issuer (Step 308) to verify that the party on the telephone line is in fact the cardholder or authorized by the cardholder. This comparison may be completed in numerous ways in accordance with voice biometrics techniques known in the art.

If some discrepancy is detected, and the party on the telephone line is not identified as the cardholder or another individual authorized by the cardholder, the transaction may be declined (Step 310) and an authentication failure message may be transmitted to the merchant. Otherwise, if the cardholder is verified as the party on the telephone line, the Issuer Automated Voice Response System may then preferably prompt the cardholder for authorization for the transaction (Step 312). This may be performed by playing information pertaining to the transaction and eliciting from the cardholder a "yes" or "no" response, which can be understood by the Issuer Automated Voice Response System. As in Step 310, if the cardholder does not authorize the transaction, the transaction may be declined (Step 316) and an authentication failure message may be transmitted to the merchant. If the cardholder authorizes the transaction, the verification is successful (Step 318), and a verification response may be generated by the Issuer and transmitted to the merchant. The merchant may then complete the transaction in accordance with a 3-D Secure protocol or using other known techniques.

Figure 4:
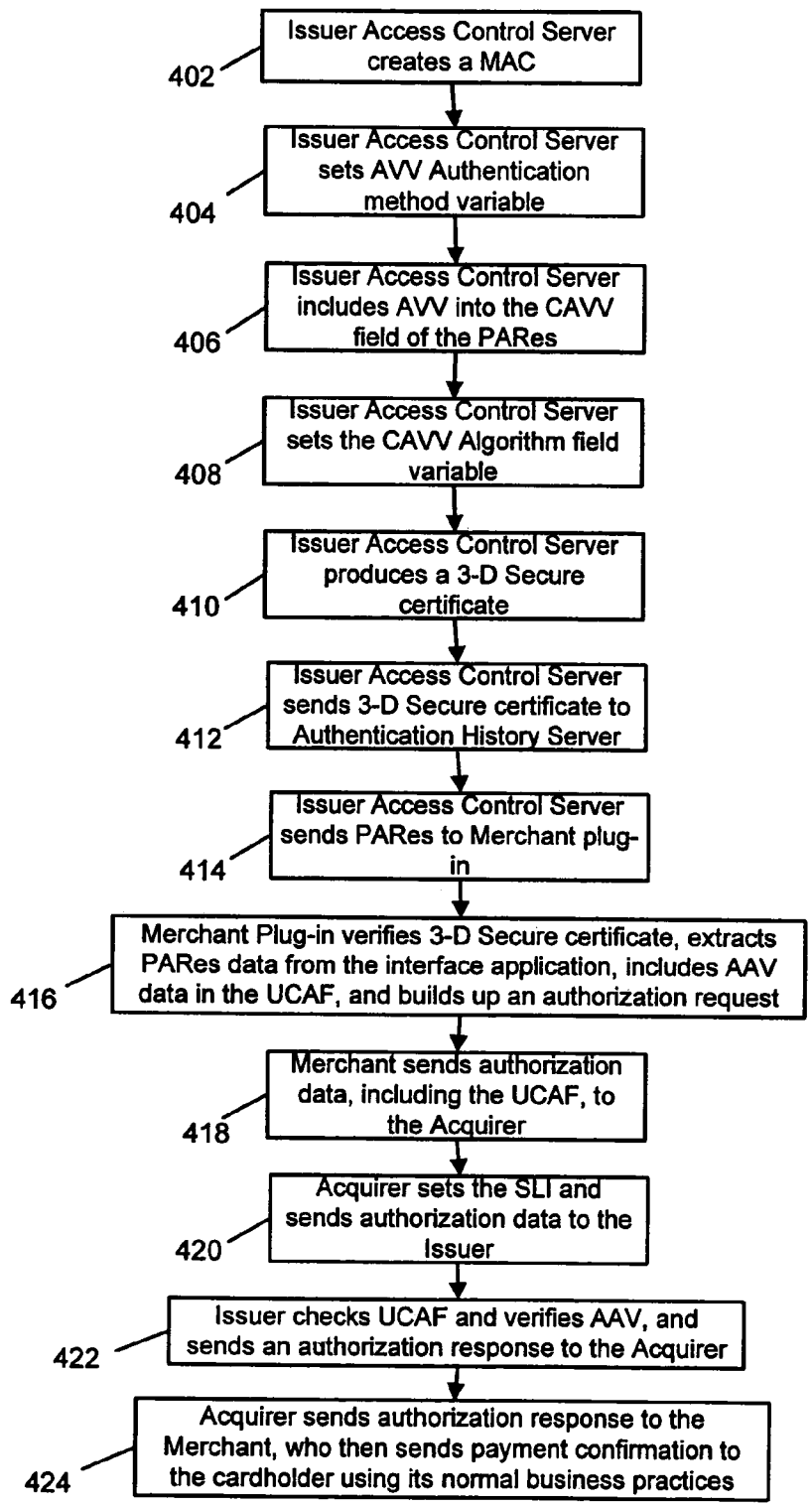
FIG. 4 is a flow diagram illustrating an exemplary procedure for conducting a payment transaction in accordance with the present invention.

In another exemplary procedure for performing a transaction with voice authentication according to the present invention, additional steps may be performed to complete the transaction after the voice authentication step (similar to that described in FIG. 3) completes successfully. Referring to FIG. 4, after the authorizing party on the receiving end of the telephone call is confirmed to be the account cardholder, the Issuer Access Control Server performs several steps to prepare the authentication response (PARes) to be transmitted to the merchant.

First, the Issuer Access Control Server creates a Message Authentication Code ("MAC") (Step 402) in accordance with the procedures described in U.S. Provisional Patent Application No. 60/477,187, entitled "Algorithm for use in a Secure Payment Application," filed on Jun. 10, 2003, and incorporated by reference hereinabove. Next, the Issuer Access Control Server sets the Application Authentication Value ("AVV") Authentication Method variable to a value of "3" (Step 404), which indicates that voice authentication was performed for this transaction. The Issuer Access Control Server then includes the AVV in the Cardholder Authentication Verification Value ("CAVV") field of the PARes message and sets the CAVV Algorithm field to a value of "3" to indicate that this is a Secure Payment Application AAV ("SPA AVV") (Steps 406 and 408).

Next the Issuer Access Control Server generates a 3-D Secure certificate in accordance with the manner described in the 3-D Secure protocol (Step 410). The Issuer Access Control Server then sends the 3-D Secure certificate to an Authentication History Server, such as MasterCard®'s Authentication History Server, for records management purposes (Step 412) and sends the PARes message to the merchant via the merchant plug-in (Step 414). The merchant next verifies the 3-D Secure certificate, extracts the PARes data supplied by the Interface Application, and begins to generate an authorization request by inserting the AAV data in the Universal Cardholder Authentication Field ("UCAF") (Step 416). The merchant then transmits the generated authentication message to the Acquirer (Step 418). The Acquirer responds by setting a Security Level Indicator (SLI) in the manner disclosed by the 3-D Secure protocol, and forwards the authorization request to the appropriate Issuer (Step 420). The Issuer next checks for the presence of the UCAF and may optionally verify the AAV, and then transmits an authorization response to the Acquirer (Step 422). Finally, the Acquirer sends the Issuer authorization response to the merchant (Step 422). The merchant should then send payment confirmation to the Cardholder using its normal business processes.

It will be appreciated by those skilled in the art that the methods and systems illustrated in FIGS. 1-4 can be implemented using various standard computer platforms operating under the control of suitable software. In some cases, dedicated computer hardware, such as a peripheral card in a conventional personal computer, may be used to enhance the operational efficiency of the above methods.

Figure 5:
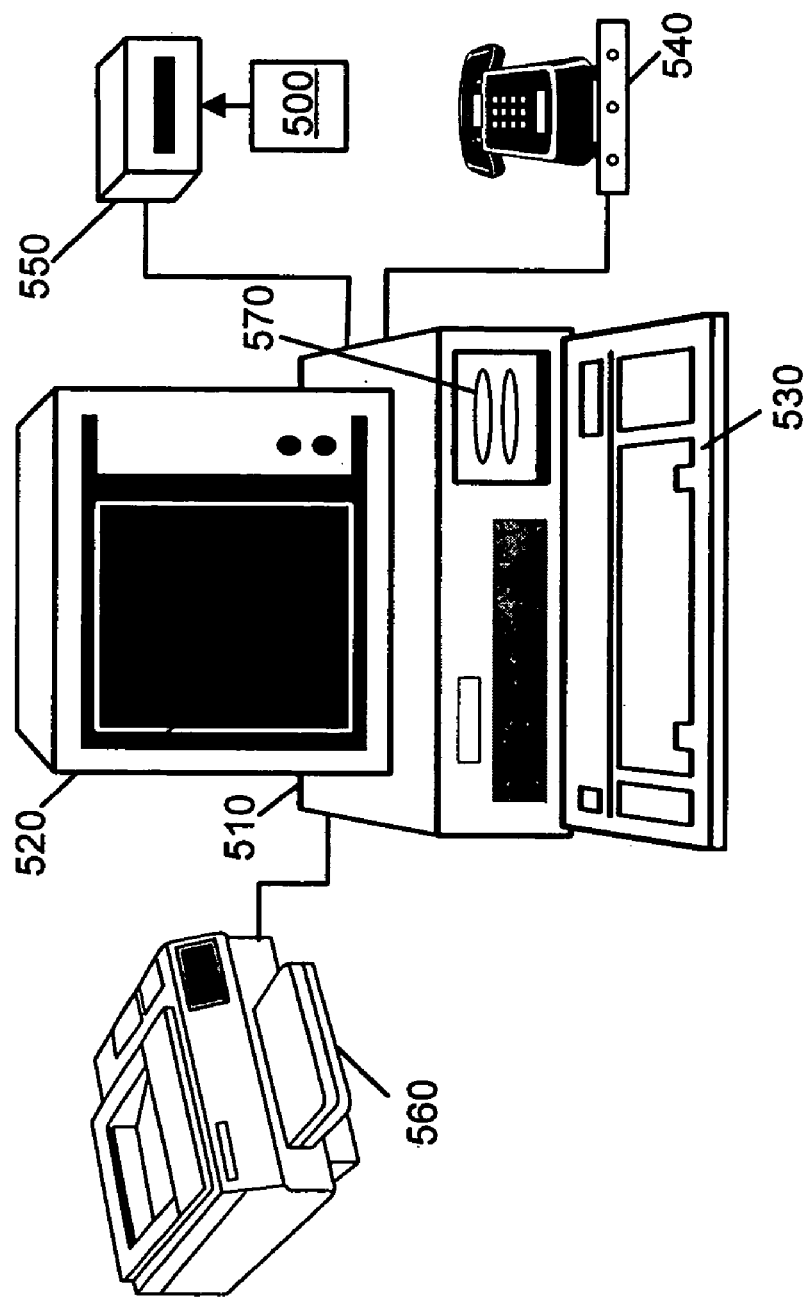
FIG. 5 is a block diagram illustrating an exemplary system for conducting a payment transaction in accordance with the present invention.
Figure 6:
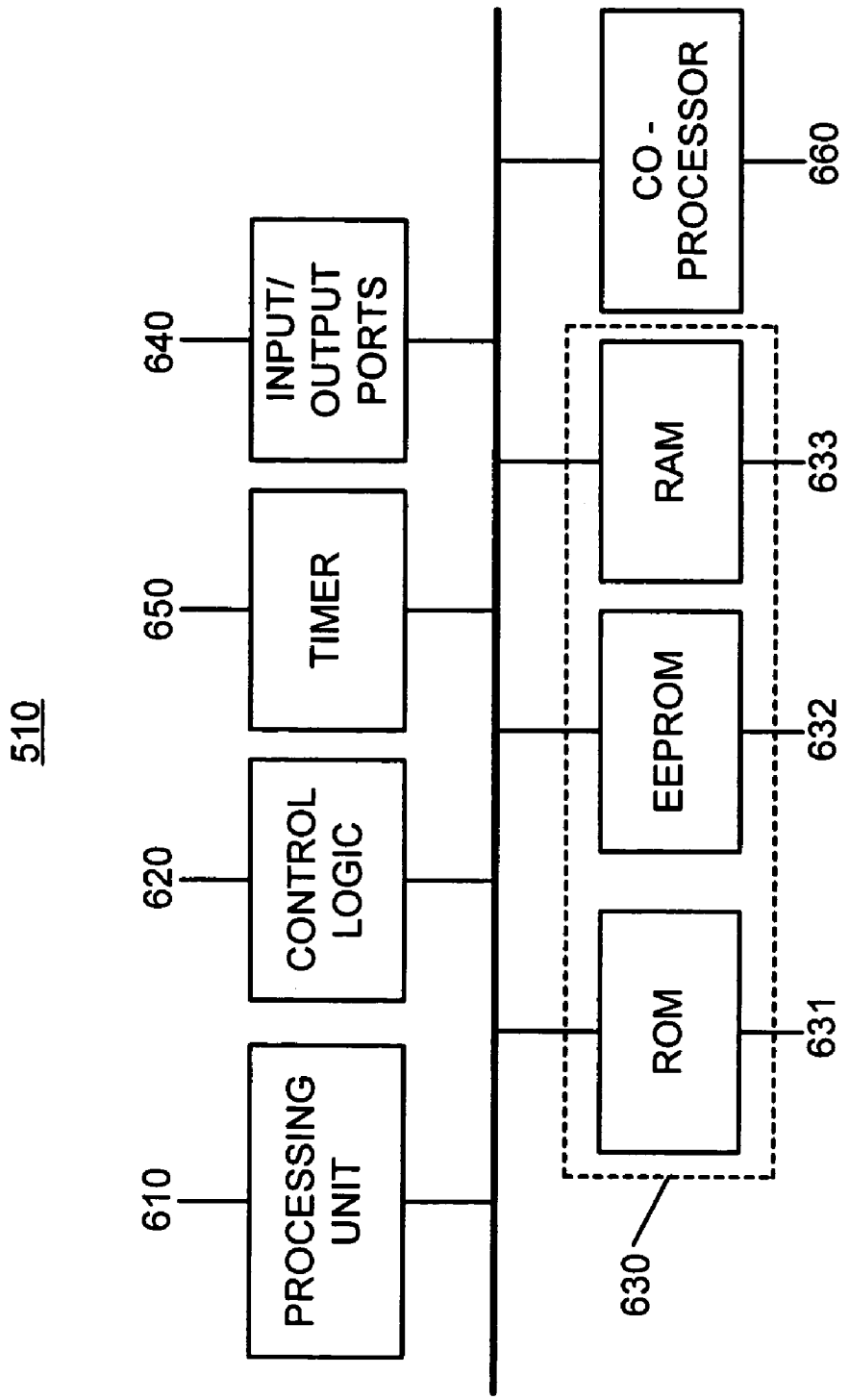
FIG. 6 is a block diagram illustrating an exemplary system for conducting a payment transaction in accordance with the present invention.

FIGS. 5 and 6 illustrate typical computer hardware suitable for practicing the present invention. Referring to FIG. 5, the computer system includes a processing section 510, a display 520, a keyboard 530, and a communications peripheral device 540 such as a modem. The system can also include a printer 560. The computer system typically includes one or more disk drives 570 which can read and write to computer-readable media such as magnetic media (i.e., diskettes) and/or optical media (e.g., CD-ROMS or DVDs), for storing data and application software. The system also typically includes an internal computer-readable medium 580 such as a hard disk drive. Other input devices, such as a digital pointer 590 (e.g., a "mouse") and a card reader 550 for reading a payment card 500 can also be included. Computer hardware such as is illustrated in FIGS. 5 and 6 can be used to run the software illustrated in FIGS. 1-4, and/or can be used to perform functions of a computer processors utilized by consumer 102, merchant 104 (and the related merchant plug-in discussed hereinabove), acquirer 106, issuer system 108, and directory system 110.

FIG. 6 is a functional block diagram which further illustrates the processing section 510. The processing section 510 generally includes a processing unit 610, control logic 620 and a memory unit 650. Preferably, the processing section 510 can also include a timer 630 and input/output ports 640. The processing section 510 can also include a co-processor 660, depending on the microprocessor used in the processing unit. Control logic 620 provides, in conjunction with processing unit 610, the control necessary to handle communications between memory unit 650 and input/output ports 640. Timer 630 provides a timing reference signal for processing unit 610 and control logic 620. Co-processor 660 provides an enhanced ability to perform complex computations in real time, such as those required by cryptographic algorithms.

Memory unit 650 can include different types of memory, such as volatile and non-volatile memory and read-only and programmable memory. For example, as shown in FIG. 6, memory unit 650 can include read-only memory (ROM) 652, electrically erasable programmable read-only memory (EEPROM) 654, and random-access memory (RAM) 656. Different computer processors, memory configurations, data structures and the like can be used to practice the present invention, and the invention is not limited to a specific platform. For example, although the processing section 510 is illustrated in FIGS. 5 and 6 as part of a computer system, the processing section 510 and/or its components can be incorporated into a PDA or a mobile telephone.

Although the present invention has been described in connection with specific exemplary embodiments, it should be understood that various changes, substitutions, and alterations apparent to those skilled in the art may be made to the disclosed embodiments without departing from the spirit and scope of the invention as set forth in the appended claims.

I claim:

1. A method for conducting a secure transaction using voice authentication wherein payment is processed from a payment account comprising:
   providing a database of payment account entries, wherein each entry comprises at least a first voice sample associated with a holder of said payment account;
   providing payment account information associated with said payment account via a voice telephone call, said payment account information to be used for conducting said transaction;
   determining if the payment account participates in voice authentication services;
   transmitting an authentication request, formatted according to the 3-D Secure authentication protocol, including said payment account information to an issuer server;
   triggering automatically a telephone call to said holder of said payment account;
   generating a second voice sample by sampling one or more voice characteristics of said holder of said payment account;
   using voice authentication technology to compare said first voice sample to said second voice sample to determine whether said transaction is authorized by said holder of said payment account; and
   wherein said authentication request includes at least a device category data field, an authentication request channel data field, a cardholder phone number data field and a voice channel transfer method data field.

2. The method of claim 1 further comprising the step of transmitting an authentication response responsive to said authentication request.

3. The method of claim 2 further comprising the step of processing payment from said payment account to complete the transaction as a function of said authentication response.

4. The method of claim 2 wherein said authentication response is formatted according to the 3-D Secure authentication protocol.

5. The method of claim 1 further comprising the step of prompting the holder for authorization to complete the transaction.

6. A method for conducting a secure transaction using voice authentication wherein payment is processed from a holder's payment account comprising:
   providing a database of payment account entries, wherein each entry comprises at least a first voice sample associated with a holder of said payment account;
   receiving payment account information associated with said payment account via a voice telephone call, said payment account information to be used for conducting said transaction;
   determining if the payment account participates in voice authentication services;
   transmitting an authentication request, formatted according to the 3-D Secure authentication protocol, including said payment account information to an issuer server, said authentication request triggering automatically by said server a telephone call to said holder;
   using voice authentication technology to authenticate the voice of said holder for purposes of authorizing said transaction;
   authorizing said transaction as a function of said authentication; and
   wherein said authentication request includes at least a device category data field, an authentication request channel data field, a cardholder phone number data field and a voice channel transfer method data field.

7. The method of claim 6 further comprising the step of receiving an authentication response responsive to said authentication request.

8. The method of claim 7 wherein said authentication response is formatted according to the 3-D Secure authentication protocol.

9. The method of claim 7 further comprising the step of processing payment from said payment account to complete the transaction as a function of said authentication response.

10. The method of claim 6 further comprising the step of prompting the holder for authorization to complete the transaction.

11. A method for conducting a secure transaction using voice authentication wherein payment is processed from a payment account comprising:
 providing a database of payment account entries, wherein each entry comprises at least a first voice sample associated with a holder of said payment account;
 determining if the payment account participates in voice authentication services;
 receiving payment account information associated with said payment account via a voice telephone call, said payment account information to be used for conducting said transaction;
 receiving an authentication request, formatted according to the 3-D Secure authentication protocol, including at least said payment account information in connection with conducting said transaction;
 triggering automatically a telephone call in response to said holder of said payment account;
 generating a second voice sample by sampling one or more voice characteristics of said holder of said payment account;
 using voice authentication technology to compare said first voice sample to said second voice sample to determine whether said transaction is authorized by said holder of said payment account; and
 wherein said authentication request includes at least a device category data field, an authentication request channel data field, a cardholder phone number data field and a voice channel transfer method data field.

12. The method of claim 11 further comprising the step of providing an authentication response responsive to said authentication request.

13. The method of claim 12 further comprising the step of processing payment from said payment account to complete the transaction as a function of said authentication response.

14. The method of claim 12 wherein said authentication response is formatted according to the 3-D Secure authentication protocol.

15. The method of claim 11 further comprising the step of prompting the holder for authorization to complete the transaction.

16. A system for conducting a secure transaction using voice authentication, comprising:
 a server computer subsystem, said server computer subsystem comprising information relating to at least one payment account including at least a first voice sample of an account holder of said payment account;
 an automated voice response subsystem; and
 a voice authentication subsystem,
 wherein said server computer subsystem determines if the payment account participates in voice authentication services, further wherein said automated voice response subsystem connects a call to said account holder to obtain a second voice sample of said account holder's voice, and further wherein said voice authentication subsystem compares said first voice sample to said second voice sample to determine whether the transaction is authorized by said account holder,
 wherein said automated voice response subsystem receives an authentication request and transmits an authentication response, wherein said payment account information is provided via a voice telephone call and further wherein said authentication request and said authentication response are formatted according to the 3-D Secure authentication protocol, and
 wherein said authentication request includes at least a device category data field, an authentication request channel data field, a cardholder phone number data field and a voice channel transfer method data field.

* * * * *